United States Patent
Routberg (Rutberg) et al.

(10) Patent No.: US 7,374,693 B1
(45) Date of Patent: May 20, 2008

(54) WATER DECONTAMINATION APPARATUS AND METHOD

(76) Inventors: Alexander F. Routberg (Rutberg), 150 Spinnaker Ridge Dr., Apt. D-115, Huntsville, AL (US) 35824; Victor Andreevich Kolikov, Grechesky av 12ap55, 191014 Saint Petersburg (RU); Rutberg Philip Grigorevich, Viboryskoe Schose 7-1-25, 194356 Saint Petersburg (RU); Bzatsev Alexandz Nikolaevich, Novostzoeyk 15 ap.27, 198152 Saint-Petersburg (RU)

( * ) Notice: Subject to any disclaimer, the term of this patent is extended or adjusted under 35 U.S.C. 154(b) by 186 days.

(21) Appl. No.: 11/287,056

(22) Filed: Nov. 25, 2005

(51) Int. Cl.
*A61K 9/14* (2006.01)
(52) U.S. Cl. .................. 210/748; 205/560; 424/489
(58) Field of Classification Search ................ 210/748, 210/243, 192, 198.1; 205/761; 424/489
See application file for complete search history.

(56) References Cited

U.S. PATENT DOCUMENTS

| | | | |
|---|---|---|---|
| 5,126,524 A | * | 6/1992 | Moro et al. ............... 219/69.12 |
| 2002/0037320 A1 | * | 3/2002 | Denes et al. ................ 424/489 |
| 2002/0056674 A1 | * | 5/2002 | Iseki et al. .................. 210/143 |
| 2006/0237643 A1 | * | 10/2006 | Guevremont et al. ....... 250/292 |

* cited by examiner

*Primary Examiner*—Walter D. Griffin
*Assistant Examiner*—Cameron J Allen
(74) *Attorney, Agent, or Firm*—Jay A. Chesavage

(57) ABSTRACT

A process and apparatus for water purification has a stationary electrode opposing a movable electrode which are positioned about a passageway for the water to be purified. The stationary electrode and movable electrode form an arc gap, and the arc gap is fed with a voltage from a pulsatile power supply. The arc gap is reduced when the current is below a first threshold and increased when the current is above a second threshold, and the arc gap change is realized by controlling a motor attached to feeder rollers coupled to the movable electrode. The apparatus causes the formation of oxide nano-particles providing durable bactericidal action.

23 Claims, 3 Drawing Sheets

US 7,374,693 B1

WATER DECONTAMINATION APPARATUS AND METHOD

FIELD OF THE INVENTION

The present invention relates to the field of water treatment and purification. More specifically, the invention relates to the user of pulsed periodic electrical discharges through water to be treated in conjunction with an electrode material supporting the arc, where the arc results in the generation of nano-particles and ions which have antibacterial and anti-fungal effects on any bacteria and fungi in the water to be treated.

BACKGROUND OF THE INVENTION

A significant amount of research and development has been undertaken in recent years toward environmental clean-up operations, and in particular to the purification and decontamination of ground water, waste water, and drinking water. A variety of techniques have been used in the prior art to destroy or remove contaminating and toxic materials such as trace organic and inorganic compounds; substances which produce color, taste and odor; pathogenic bacteria; and harmful suspended materials.

These techniques include the use of shock waves created by ultrasonic vibrations and exposing the water to ultraviolet radiation (see, for example, U.S. Pat. No. 6,071,473 to Darwin; U.S. Pat. No. 5,230,792 to Sauska and EP 959046 to Yoshinaga et al.).

Electricity has also been employed as a decontamination agent, such as by introducing positively charged ions into a water stream to cause coagulation and separation of particles, and by the passing of electric current within a fluid chamber (see, for example, U.S. Pat. No. 4,917,782 to Davies; U.S. Pat. No. 5,531,865 to Cole; U.S. Pat. No. 6,346,197 to Stephenson; and U.S. Pat. No. 6,331,321 to Robbins). In this case, the current flowing between the anode and cathode has a toxic effect on microorganisms nearby.

The utilization of ozone for the purification and disinfection of water is a known and effective technique (see, for example, U.S. Pat. No. 4,352,740 to Grader et al.; U.S. Pat. No. 4,382,044 to Baumgartner; U.S. Pat. No. 4,767,528 to Sasaki et al.; U.S. Pat. No. 5,266,216 to Agueda; U.S. Pat. No. 5,683,576 to Olsen; U.S. Pat. No. 5,711,887 to Gastman et al.; U.S. Pat. No. 6,068,778 to Steiner at al; U.S. Pat. No. 6,146,524 to Story U.S. Pat. No. 6,419,831 to Wang; and U.S. Pat. No. 6,402,945 to Swales et al.). However, it has not yet come into widespread use, such as the general acceptance and widespread use of chlorine.

Various techniques for water purification containing organic concomitants based on contacting the water with ozone in the presence of various mixed catalysts are described in U.S. Pat. No. 4,029,578 to Turk; U.S. Pat. No. 5,620,610 to Ishii; U.S. Pat. No. 6,149,820 to Pedersen; and U.S. Pat. No. 6,251,264 to Tanaka. In particular, the heterogeneous catalyst utilized in U.S. Pat. No. 4,029,578 comprises water insoluble salts, for example, insoluble carbonate, sulfate, oxide, halide or sulfide of such metals as copper, cadmium, and group VIII metals, etc.

According to U.S. Pat. No. 6,149,820, the water enriched with ozone is passed through a catalyst, consisting of activated carbon as the carrier for metal oxides including iron oxide, cobalt oxide, nickel oxides, manganese oxide. Furthermore, the catalyst can contain one or more of the noble metals, e.g., platinum or palladium.

A technique is known in the art, sometimes under the name electro-hydraulics, which utilize high-energy electrical discharge into a volume of liquid for the purpose of disinfecting water, changing chemical constituents and recovering metals and other substances from liquids or slurries (see, for example, U.S. Pat. No. 3,366,564 to Allen; U.S. Pat. No. 3,402,120 to Allen et al.; and U.S. Pat. No. 4,957,606 to Juvan). According to this technique, an electrohydraulic shock wave within the liquid, intensive light radiation and thermo-chemical reactions are initiated by arc discharge into a spark gap formed by the electrodes immersed in the liquid. One of the drawbacks of this technique is associated with the fact that in the repeated discharging of a high-energy electrical arc across the gap between electrodes, the electrodes are rather rapidly eroded and burned up. Similarly, switching components are consumed by burnup.

U.S. Pat. No. 5,464,513 to Goriachev and U.S. Pat. No. 5,630,915 to Green et al. describes a water purification technique which concurrently uses a synergistic combination of pulsed mechanical shock waves, ultraviolet radiation, and ionization of the water stream, as disinfecting and purification actions within the water to be treated. The water treatment system of this technique includes a pair of electrodes extending transversely across and through a discharge chamber. Contaminated water is introduced into the chamber through an intake port where it passes either through or proximate to the discharge area. A pulse power unit delivers a rapid sequence of arc inducing electrical pulses across the electrodes, thereby producing a series of electric discharge arcs across the discharge area between the electrodes. The arcs are of sufficient energy whereby a plasma inducing arc is sustained through the water across the electrodes, generating lethal levels of ultraviolet radiation, as well as mechanical shock waves having the capacity of directly killing microorganisms and weakening others. Furthermore, molecules of water proximate to the discharge area are broken down into excited radicals, including hydroxyl ions and free oxygen, which combine with organic chemicals to eliminate them from the water stream.

RU Pat. No. 2136600 to Boyev et al. describes a technique for water purification by means of barrier high energy electric discharges formed as a result of the application of a pulsed electric field applied between the electrodes to an air-water mixture formed from water jets and drops. The pulsed electric filed is characterized by the pulse duration shorter than 0.5 microseconds, the slope of the pulse's front greater than $10^9$ V/s and the amplitude of the field strength being in the range of 20-100 kV/cm. For this purpose, the high voltage pulses are applied with the frequency higher than 50 Hz. The frequency magnitude f is selected from the condition $$f \geq 50 \frac{v}{h}$$

where v is the speed of the water flux and h is the height of the electrode system. The values of the pulse parameters were chosen such that the conductivity of the system at these pulse conditions is significantly small, i.e., the water is an electrical insulator.

The electrode system includes a set of electrodes implemented in the form of two combs. One of the combs is coupled to the generator of the high voltage pulses, while the electrodes of the other comb are grounded. The electrodes are covered by an electrical insulating barrier in the form of tubes made of quartz glass.

Various configurations of the electrode system that can be utilized in the device for water purification are disclosed in RU Pat. Nos. 2136601; 2136602 and 2152359 to Ryazanov et al.

In particular, RU Pat. No. 2136601 describes a discharge chamber including a high voltage and grounded electrodes implemented in the form of a volume grid wherein the high voltage electrode is arranged between the grounded electrodes. RU Pat. No. 2136602 describes an electrode system wherein the grounded electrode is in the form of a cylinder, while the high voltage electrode is in the form of a cylindrical brush which is housed within the ground electrode. RU Pat. No. 2152359 describes a discharge chamber including a high voltage electrode is implemented in the form of a volume grid, while the grounded electrode is configured as a perforated partition implemented in the form of hollow cylinders.

U.S. Pat. No. 5,464,513 by Goriachev et al describes a water decontamination system which provides for the passage of an electric discharge through a liquid to be decontaminated.

Each of the systems relying on electrical discharges also includes a fixed separation distance between electrodes, and when the electrodes erode, some form of readjustment of the interelectrode gap becomes necessary. Additionally, the use of an optimal electrode spacing for the selection of a particular nano-particle size is not possible with the prior art configurations.

OBJECTS OF THE INVENTION

A first object of the invention is an electric arc discharge water decontamination system which has a self-adjusting arc length.

A second object of the invention is an electric arc discharge water decontamination system which uses a movable wire electrode that is fed towards a fixed electrode thereby forming an arc gap extent.

A third object of the invention is an electric arc discharge water decontamination system which uses the magnitude of current flowing through the arc to determine when to increase or decrease the arc gap spacing.

SUMMARY OF THE INVENTION

A water purification system comprises a passageway for water to be decontaminated, a fixed electrode within the passageway, and a moving electrode which feeds towards the fixed electrode as the moving electrode is consumed. The moving electrode may be a wire or any other suitable electrode for continuous feeding into the fixed electrode. Additionally, the moving electrode may be formed of any of the materials Iron (Fe), Copper (Cu), Silver (Ag), or Titanium (Ti). The moving electrode is grounded and may include a spool of wire which delivers the moving electrode, while the stationary electrode may be at a pulsed and elevated voltage, and also have a large surface area.

DETAILED DESCRIPTION OF THE INVENTION

Figure 1:
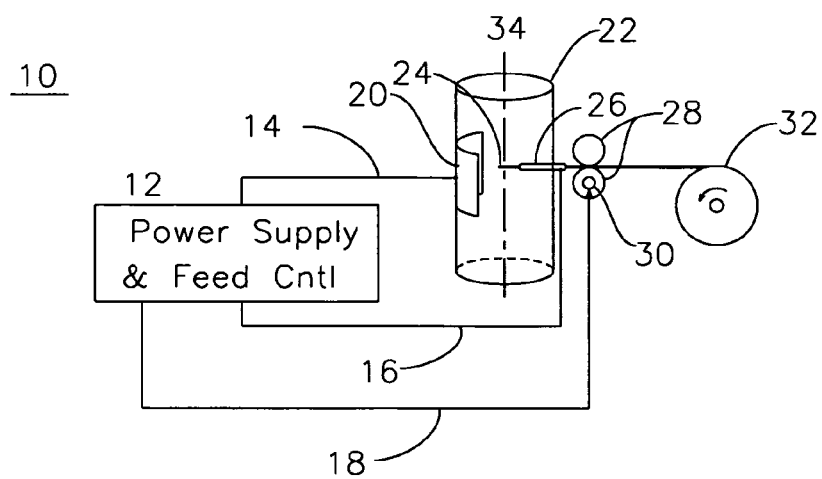
FIG. 1 shows the water purification system of the present invention.

FIG. 1 shows the water decontamination system 10 of the present invention. A conduit 22 for the passage of water to be treated includes a passageway 34 through which the water passes and encounters a fixed electrode 20 with a large surface area compared to the movable electrode 24 which passes through a sleeve 26. The passageway 34 may also define the separation between the fixed electrode and moving electrode, and may be in the range of 10-15 mm separation, or diameter if the passageway is circular. The movable electrode 24, sleeve 26, feed rollers 28, and feed spool 32 are preferentially at a ground potential for safety purposes, while the fixed electrode 20 is at a potential sufficient to encourage electrical arcing through the passageway 34. The separation distance between the feed electrode 24 and fixed electrode 20 may be varied, or additional electrode may be fed into the passageway 34 using feed rollers 28, which are coupled to a motor 30. The motor 30 is controlled by current measurements taken by the power supply 12 which is furnishing the arc current flowing through conductors 14 and 16, and may use a variety of measurement techniques to control the arc gap. In one embodiment, the movable electrode comprises a wire electrode having a diameter from 0.8 mm to 1.5 mm, and the wire is unwound from spool 32.

Figure 2:
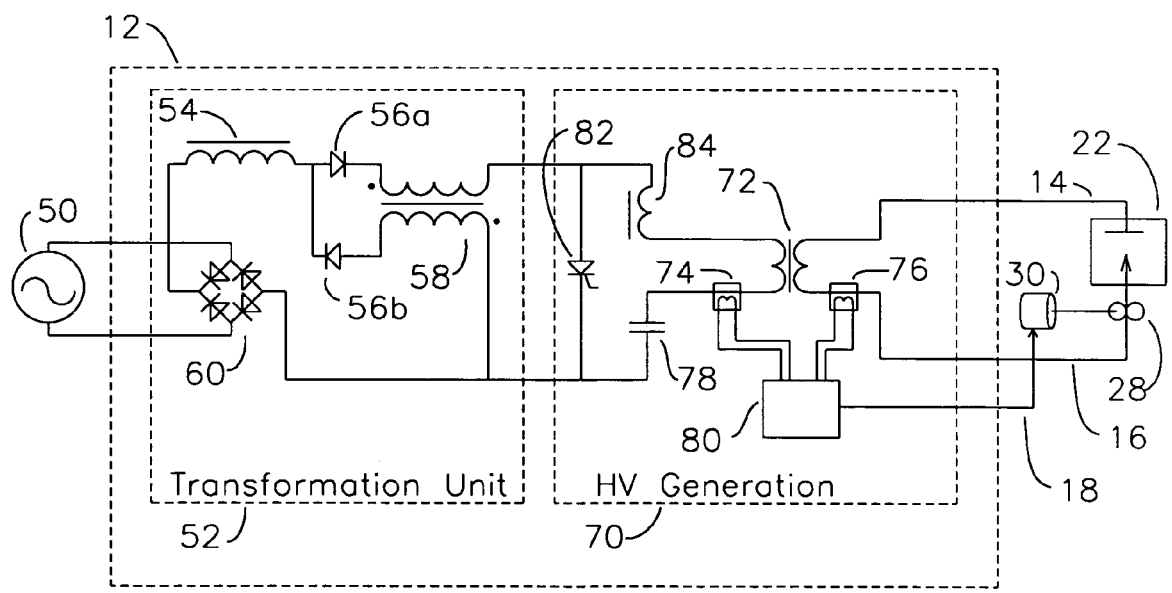
FIG. 2 shows the power supply for the arc generation and electrode position control for the apparatus of FIG. 1.

In one embodiment shown in FIG. 2, alternating voltage 220 V from the supply network 50 is supplied to the bridge rectifier 60, after which the pulsatile DC is applied to current limiting inductor 54 and boost transformer 58 via diodes 56a and 56b. The voltage developed in the transformation unit 52 is fed to the input of the high voltage generator 70 and charges the capacity 78 by flowing through the primary of the HV transformer 72 and current limit inductor 84. When storage capacitor 78 is fully charged, thyristor switch 82 closes, causing the storage capacitor 78 to dump charge into the primary winding of HV transformer 72, limited only by current limit inductor 84. This current in the primary winding of the transformer 72 is sensed by the primary current sensor 74 which sends the current measurement to the feed control unit 80. The secondary winding of the transformer 72 then generates a pulsed voltage of 30-100 kV, which is supplied to the electrode conductors 14 and 16, and causes the electric discharge across the fluid conduit 22. Passing of the electric current in the secondary winding of the transformer is registered by the secondary current sensor 76, and this measurement is also sent to the feed control unit 80. Water is decontaminated in the fluid conduit 22 under the action of the periodical electric discharges combined with the nano-particles generated by the arc. Energy in the arc current pulse is 0.1-3.0 J, and the discharge duration is 1-30 μs. As the movable electrode 24 of FIG. 1 is consumed by successive arc events, the distance from the fixed electrode 20 and movable electrode 24 increases until the discharge does not occur because of an excessive arc gap, and a discharge without emission occurs. When there is no current in the loop of the secondary winding of the transformer 72 because of an absence of arc current, the signal from the secondary current sensor 76 is minimal, and the feed control 80 senses this. When such a glow event rather than a discharge occurs, this is sensed by feed control 80. Comparison of the value of the secondary transformer current sensor 76 with a nominal value corresponding to a normal arc discharge takes place in the feed controller 80. If as a result of such comparison the deviation of the magnitude of the incoming secondary current sensed 76 from the nominal value is determined, the signal from the feed controller 80 is fed to the motor or actuator 30, which feeds the movable electrode 24 of FIG. 1 until the specified distance between the electrodes 20 and 24 of FIG. 1 is achieved and decontamination arcing in the chamber 22 resumes. When the signal value of the secondary current sensor 76 is restored, the feed controller 80 stops sending feed actuation commands to motor/actuator 30 and further feeding of the movable electrode 24 stops. In this manner, the automatic feed control of the distance between the electrodes in the chamber is maintained, the movable electrode is slowly consumed by the generation of nano-particles, and the water decontamination may continuously occur through the application of a succession of arc discharge events, as described. Moreover, there is a significant intensification of the bactericidal action caused by purposeful increase of the specific amount of metal nano-particles with dimensions on the order of 5 nm due to the erosion of the electrodes. Additionally, it is possible to use the nano-particle size distribution to make further corrections to the arc gap separation, thereby ensuring continuous purification of the water passing through the passageway 34 of FIG. 1. Additionally, maintenance is reduced, as the consumable electrode is replenished continuously from a spool 32, rather than requiring periodic replacement as in the prior art.

As described earlier, erosion of electrode material from the pulsed electrical discharges causes nanoparticle formation from arcing across the electrode metal. Nano-particles are thereafter oxidized in water and with gradual dissolution over time generate ions for several months. Therefore, it is essential that the water treatment chamber where the ionic generation occurs have treatment conduits, pipes, and an d storage containers handling treated water to be made from dielectrical materials. In the case when the movable electrode materials are copper, the nano-particles generated consist of copper oxides: $CuO$ and $Cu_2O$. At a pH level less than 3 and at neutral pH of 7 in the presence of amino acids, the nano-particles completely convert into $Cu+$ and $Cu++$ ions. Thus the decontaminated water after processing is dispersive, composed of ions and nano-particles, which continue to spread through the volume and increasing the anti-bacterial and anti-fungal action.

Figure 3:
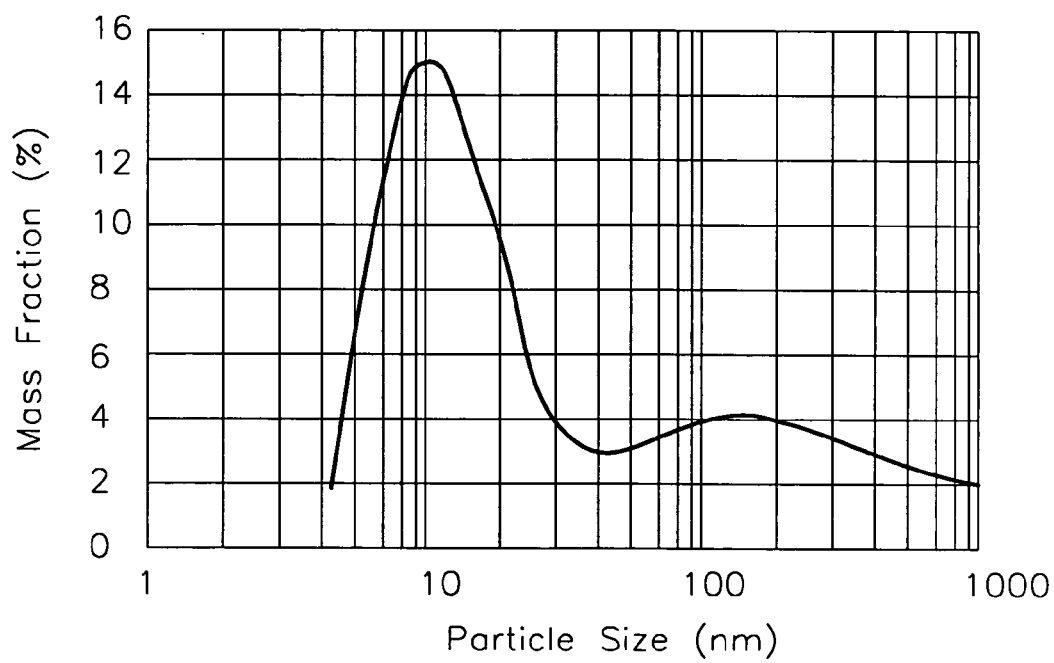
FIG. 3 is a graph which shows the distribution of nano-particles versus particle size of the present invention.

FIG. 3 shows the nano-particle distribution for the apparatus of FIG. 1 where the diameter of the conduit 22 of FIG. 1 is 10-15 mm as described earlier, although it is clear the conduit may be any shape or size. As can be seen from FIG. 3, the majority of particles are in the 10 nm range, which is desirable in terms of anti-bacterial and anti-fungal effect on the water to be treated. Additionally, nano-particles have sizes ranging from 5 to 50 nm, and when present in solution the nano-particles may occur as single particles as well as clusters of several joined nano-particles.

Figure 4:
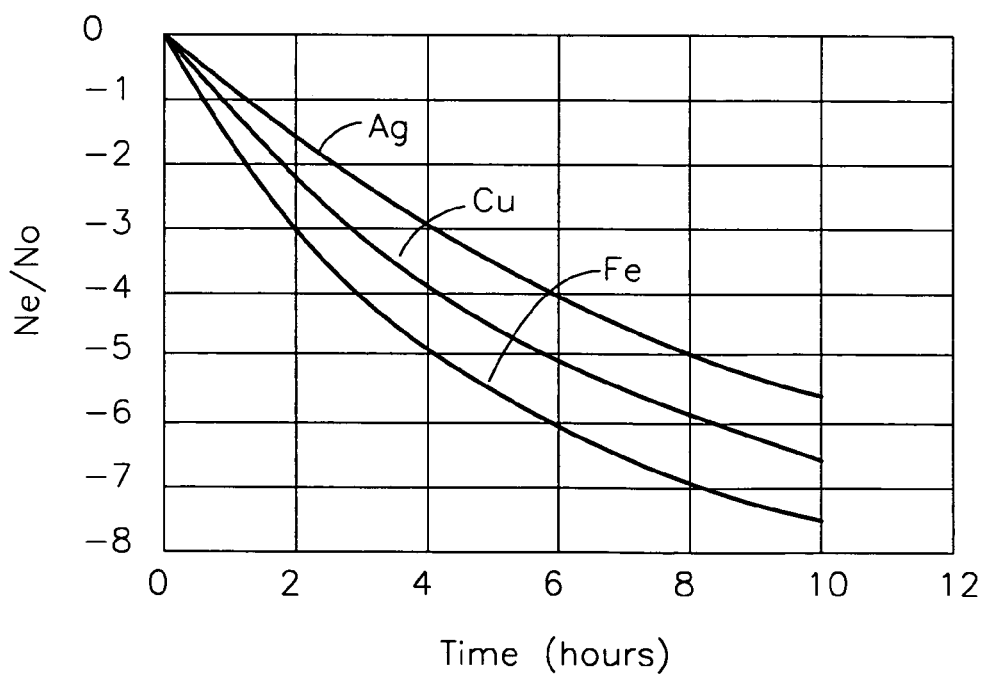
FIG. 4 is a graph which shows the effect of ionic damage to microorganisms such as E. coli for various electrode materials versus electrical discharge energy density for the present invention.

FIG. 4 shows the anti-bacterial effect of nano-particles on the water to be treated, expressed as the ratio of particles present before and after treatment. It can be seen from FIG. 4 that the greatest anti-bacterial effect for a given arc discharge energy is for Silver particles, followed by Copper, and then by Iron.

Figure 5:
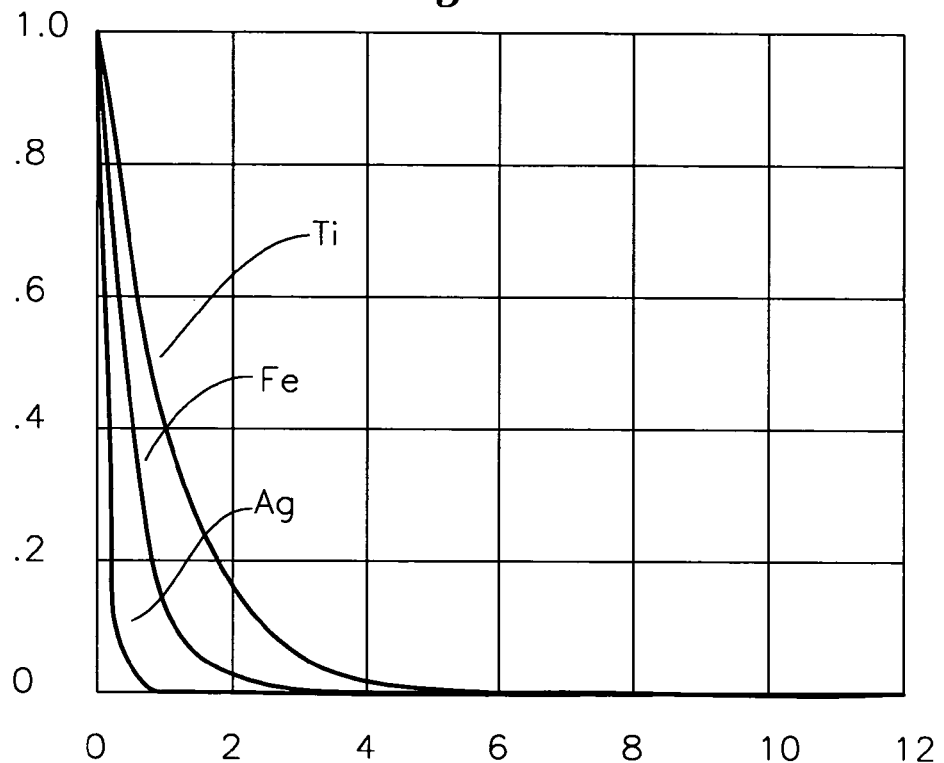
FIG. 5 is a graph which shows the effectiveness of the ionic particles in neutralizing microorganisms such as E. coli versus time.
Figure 6:
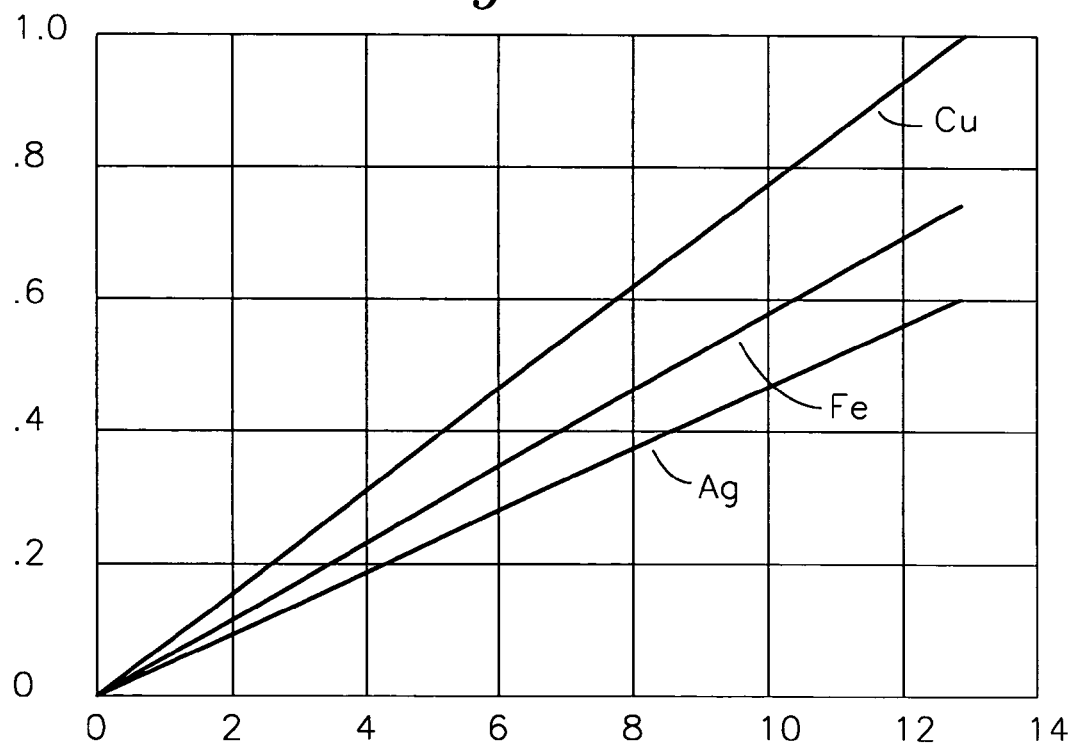
FIG. 6 shows a graph of ionic concentration versus input energy for the present invention.

FIG. 5 show the anti-bacterial and anti-fungal effect of nano-particles over time for the elements Titanium, Iron, and Silver, expressed as a percentage of living matter versus time.

The below table lists K0 coefficients for ions without microparticles or nano-particles, as would be generated using a prior art ionic system:

| Wo (J/ml) | K0(Ag) | K0(Cu) | K0(Fe) |
|---|---|---|---|
| 1.5 | 50-90% | 80-90% | 0 |
| 3 | 95-99% | 90-95% | 80 |
| 6 | 95-99% | 90-95% | 90-95% |
| 8 | 100% | 95-99% | 94-97% |
| 12 | 100% | 99% | 98-99% |

The below table lists K0 coefficients for ions with microparticles or nano-particles, as would be generated using the present system:

| Wo (J/ml) | K0(Ag) | K0(Cu) | K0(Fe) |
|---|---|---|---|
| 1.5 | 0% | 95-99% | 90% |
| 3 | 90% | 100% | 90-99% |
| 6 | 100% | 100% | 95-99% |
| 8 | 100% | 100% | 100% |
| 12 | 100% | 100% | 99% |

In this manner, an improved water purification system is described. The electrodes may be made from any of the materials described herein, but not limited to those described as Titanium, Silver, Copper, Iron, or Silver, and the electrode may be formed from a solid material, or a base material with a coating of the described metal. The electrode gap is controlled during the arc to maintain a spacing consistent with either persistent arc development, or after the arc is generated, the desired nano-particle level, such as 5 nm or 10 nm as shown. One means of controlling this gap is the measurement of secondary current, although it is also possible to measure the gap using optical means, or any other means which provides for an optimum anti-bacterial or anti-fungal result.

We claim:

1. A water purification apparatus, the apparatus including:
   a passageway for water to be purified;
   a stationary electrode formed on a region of said passageway;
   a movable electrode opposite said stationary electrode, said passageway passing between said stationary electrode and said moving electrode;
   a voltage source coupled to a switch and providing a voltage across said stationary electrode and said movable electrode, said voltage sufficient to generate an arc producing anti-bacterial or anti-fungal nano-particles from said movable or said stationary electrode;
   said movable electrode adjusted after an arc event to a spacing where said arc produces an optimum level of said nano-particles
   where said movable electrode feeds from a spool of said movable electrode.

2. The water purification apparatus of claim 1 where said movable electrode includes at least one feed roller driven by a motor.

3. The water purification apparatus of claim 2 where said motor operates to reduce said arc gap when a power supply current is below a first threshold, and said motor operates to increase said arc gap when a power supply current is above a second threshold.

4. A water purification apparatus having:
an elongate channel for the passage of a fluid to be purified, said elongate channel having a concave conductive surface on one side of said channel and a feed electrode including a stationary mount and a moveable wire on the opposing side of said channel, the distance from said feed wire to said concave electrode forming an arc gap;
a source of voltage applied across said arc gap;
where upon application of said voltage and consumption of said feed electrode from an arc forming across said arc gap, said electrode is fed into said arc gap to maintain a substantially uniform said arc gap distance, and where said arc produces nano-particles for the decontamination of said fluid.

5. The water purification apparatus of claim 4 where said fluid contains water.

6. The water purification apparatus of claim 4 where said elongate channel is cylindrical and has a central axis where said concave electrode has an included angle about said central axis which is less than 180 degrees.

7. The water purification apparatus of claim 4 where said feed wire or said concave electrode contains in pure or alloy form at least one of the materials Titanium, Silver, Copper, Iron, or Silver.

8. The water purification apparatus of claim 4 where said feed wire has a diameter in the range of 0.8 mm to 1.5 mm.

9. The water purification apparatus of claim 4 where said voltage source is a charged capacitor with an energy in the range of 0.1 J to 3.0 J, and said charged capacitor is coupled to said arc gap using a switch which is open during a charging time and closed during an arc generation time.

10. The water purification apparatus of claim 4 where said voltage source is applied for 1 us-30 us.

11. The water purification apparatus of claim 4 where electrode feed is performed after discharge of said voltage from a capacitor, after which discharge said capacitor is recharged and said electrode fed to restore said arc gap length.

12. The water purification apparatus of claim 4 where said movable electrode is at least one of the materials Copper, Titanium, Silver, or Iron, and said nano-particles include at least one of the copper oxides $CuO$ and $Cu_2O$, silver oxide $Ag_2O$, iron oxides $Fe_2O_3$, $Fe_3O_4$, or titan oxides $TiO$, $Ti_2O_3$.

13. The water purification apparatus of claim 4 where said elongate channel has a diameter of 10 mm-15 mm.

14. A water purification apparatus comprising:
a capacitor for energy storage;
a switch in series with said capacitor and an arc gap;
a capacitor charging system for charging said capacitor;
an elongate channel for the passage of a fluid along an axis, said elongate channel having a conductive region on one surface and a feed electrode on the opposing surface thereby forming said arc gap, said feed electrode including a movable wire for feeding said wire towards said conductive region, said movable wire fed to form a substantially uniform arc gap length over successive arc discharges;
where, repetitively, said capacitor is charged to an operating voltage while said switch is open, after which said switch is closed and said capacitor discharges across said arc gap thereby forming nano-particles which include ions from said feed electrode, and said feed electrode is moved to maintain said arc gap length.

15. The water purification apparatus of claim 14 where said elongate channel contains water to be purified by said nano-particles.

16. The water purification apparatus of claim 14 where said elongate channel is cylindrical having a central axis, and said one side of channel is an included angle about said axis, and said included angle is less than 180 degrees.

17. The water purification apparatus of claim 14 where said feed wire contains at least one of the materials Titanium, Silver, Copper, Iron, or Silver, or an alloy of Titanium, Silver, Copper, Iron, or Silver.

18. The water purification apparatus of claim 14 where said feed wire has a diameter in the range of 0.8 mm to 1.5 mm.

19. The water purification apparatus of claim 14 where said voltage source is a charged capacitor with an energy in the range of 0.1 J to 3.0 J.

20. The water purification apparatus of claim 14 where said voltage source is applied for 1 us-30 us.

21. The water purification apparatus of claim 14 where said electrode feed is performed after discharge of said voltage from a capacitor, after which discharge said capacitor is recharged and said electrode fed to restore said arc gap length.

22. The water purification apparatus of claim 14 where said movable electrode is at least one of the materials Copper, Titanium, Silver, or Iron, and said nano-particles include at least one of the copper oxides $CuO$ and $Cu_2O$, silver oxide $Ag_2O$, iron oxides $Fe_2O_3$, $Fe_3O_4$, or titan oxides $TiO$, $Ti_2O_3$.

23. The water purification apparatus of claim 14 where said elongate channel has a diameter of 10 mm-15 mm.

* * * * *

UNITED STATES PATENT AND TRADEMARK OFFICE
CERTIFICATE OF CORRECTION

| | |
|---|---|
| PATENT NO. | : 7,374,693 B1 |
| APPLICATION NO. | : 11/287056 |
| DATED | : May 20, 2008 |
| INVENTOR(S) | : Alexander P. Routberg (Rutberg) et al. |

It is certified that error appears in the above-identified patent and that said Letters Patent is hereby corrected as shown below:

Column 2, line 47 "electric filed is" should be changed to --electric field is--

Signed and Sealed this

Tenth Day of November, 2009

David J. Kappos
*Director of the United States Patent and Trademark Office*

UNITED STATES PATENT AND TRADEMARK OFFICE
CERTIFICATE OF CORRECTION

PATENT NO.         : 7,374,693 B1                                                Page 1 of 1
APPLICATION NO. : 11/287056
DATED               : May 20, 2008
INVENTOR(S)       : Alexander F. Routberg (Rutberg) et al.

It is certified that error appears in the above-identified patent and that said Letters Patent is hereby corrected as shown below:

Column 2, line 47 "electric filed is" should be changed to --electric field is--

This certificate supersedes the Certificate of Correction issued November 10, 2009.

Signed and Sealed this

Twenty-sixth Day of January, 2010

David J. Kappos
*Director of the United States Patent and Trademark Office*